US011030259B2

(12) United States Patent
Mullins et al.

(10) Patent No.: US 11,030,259 B2
(45) Date of Patent: Jun. 8, 2021

(54) DOCUMENT SEARCHING VISUALIZED WITHIN A DOCUMENT

(71) Applicant: Microsoft Technology Licensing, LLC, Redmond, WA (US)

(72) Inventors: Christopher Lee Mullins, Sammamish, WA (US); Robert Earl Standefer, III, Duvall, WA (US); Miguel Oom Temudo de Castro, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 625 days.

(21) Appl. No.: 15/098,240

(22) Filed: Apr. 13, 2016

(65) Prior Publication Data

US 2017/0300481 A1    Oct. 19, 2017

(51) Int. Cl.
| | | |
|---|---|---|
| *G06F 16/93* | (2019.01) | |
| *G06F 16/248* | (2019.01) | |
| *G06F 16/901* | (2019.01) | |
| *G06F 16/338* | (2019.01) | |
| *G06F 40/169* | (2020.01) | |

(52) U.S. Cl.
CPC ............ *G06F 16/93* (2019.01); *G06F 16/248* (2019.01); *G06F 16/338* (2019.01); *G06F 16/9024* (2019.01); *G06F 40/169* (2020.01)

(58) Field of Classification Search
CPC ......... G06F 17/30011; G06F 17/30696; G06F 17/30958; G06F 17/30554; G06F 17/241; G06F 16/338; G06F 16/9024; G06F 16/248; G06F 16/93
See application file for complete search history.

(56) References Cited

U.S. PATENT DOCUMENTS

| | | | | |
|---|---|---|---|---|
| 6,324,551 B1 * | 11/2001 | Lamping | ................. | G06F 16/93 715/229 |
| 6,356,922 B1 * | 3/2002 | Schilit | ..................... | G06F 16/30 715/236 |
| 6,421,691 B1 * | 7/2002 | Kajitani | ................. | G06Q 10/10 706/61 |
| 6,484,162 B1 * | 11/2002 | Edlund | ............... | G06F 16/2428 |
| 6,928,425 B2 * | 8/2005 | Grefenstette | ........... | G06F 16/38 715/209 |
| 7,103,609 B2 | 9/2006 | Elder et al. | | |
| 7,334,195 B2 | 2/2008 | Gemmell et al. | | |

(Continued)

OTHER PUBLICATIONS

"International Search Report and Written Opinion Issued in PCT Application No. PCT/US2017/027388", dated Jul. 12, 2017, 13 Pages.

(Continued)

*Primary Examiner* — Miranda Le
(74) *Attorney, Agent, or Firm* — Michael Best & Friedrich LLP

(57) ABSTRACT

A facility for annotating a visual representation of a document is described. The facility presents on a display device visual representations of two or more portions of a document. The facility further present on the display on the display, in connection with each of one or more of the presented document portion visual representations, an annotation conveying a result of aggregating information describing two or more search transactions in whose results the represented document portion is included.

11 Claims, 8 Drawing Sheets

(56) References Cited

U.S. PATENT DOCUMENTS

| | | | |
|---|---|---|---|
| 7,395,501 B2* | 7/2008 | Graham | G06F 16/40 |
| | | | 715/254 |
| 7,437,330 B1* | 10/2008 | Robinson | G06Q 20/04 |
| | | | 705/67 |
| 7,478,129 B1 | 1/2009 | Chemtob | |
| 7,627,582 B1 | 12/2009 | Ershov | |
| 7,627,590 B2* | 12/2009 | Boguraev | G06F 17/214 |
| 7,689,624 B2 | 3/2010 | Huang et al. | |
| 7,703,021 B1 | 4/2010 | Flam | |
| 7,752,204 B2* | 7/2010 | Kao | G06F 16/345 |
| | | | 707/736 |
| 7,849,090 B2 | 12/2010 | Sweeney | |
| 7,865,494 B2* | 1/2011 | Best | G06F 16/9535 |
| | | | 707/707 |
| 8,005,825 B1* | 8/2011 | Ghosh | G06F 16/951 |
| | | | 707/723 |
| 8,005,835 B2* | 8/2011 | Walther | G06F 16/9558 |
| | | | 707/736 |
| 8,150,820 B1 | 4/2012 | Herbach et al. | |
| 8,170,932 B1* | 5/2012 | Krakowiecki | G06Q 40/12 |
| | | | 705/30 |
| 8,458,196 B1 | 6/2013 | Procopio | |
| 8,515,816 B2* | 8/2013 | King | H04N 1/00244 |
| | | | 705/26.5 |
| 8,538,967 B1* | 9/2013 | Wu | G06Q 40/02 |
| | | | 707/737 |
| 8,554,800 B2* | 10/2013 | Goldentouch | G06F 16/81 |
| | | | 707/797 |
| 8,577,911 B1 | 11/2013 | Stepinski et al. | |
| 8,689,108 B1 | 4/2014 | Duffield et al. | |
| 8,825,711 B2 | 9/2014 | Chan et al. | |
| 8,930,400 B2 | 1/2015 | Adamic et al. | |
| 9,043,695 B2* | 5/2015 | Saito | G06F 16/9027 |
| | | | 715/234 |
| 9,092,773 B2* | 7/2015 | Daly | G06Q 30/06 |
| 9,117,240 B2 | 8/2015 | Vaynblat et al. | |
| 9,396,177 B1 | 7/2016 | Kursun | |
| 9,588,941 B2* | 3/2017 | Carrier | G06F 17/211 |
| 9,626,455 B2* | 4/2017 | Miller | G06F 16/248 |
| 9,710,129 B2 | 7/2017 | Dunne et al. | |
| 9,792,583 B2 | 10/2017 | Perreault et al. | |
| 2004/0013302 A1* | 1/2004 | Ma | G06F 17/30923 |
| | | | 382/209 |
| 2004/0024739 A1* | 2/2004 | Copperman | G06F 17/30616 |
| 2004/0088315 A1 | 5/2004 | Elder et al. | |
| 2004/0194021 A1* | 9/2004 | Marshall | G06F 40/169 |
| | | | 715/232 |
| 2004/0205046 A1 | 10/2004 | Cohen et al. | |
| 2004/0255265 A1 | 12/2004 | Brown et al. | |
| 2004/0261016 A1* | 12/2004 | Glass | G06Q 10/107 |
| | | | 715/230 |
| 2007/0003166 A1* | 1/2007 | Berkner | G06K 9/00463 |
| | | | 382/298 |
| 2007/0055831 A1 | 3/2007 | Beeston et al. | |
| 2007/0294614 A1* | 12/2007 | Jacquin | G06F 17/2247 |
| | | | 715/230 |
| 2008/0148159 A1 | 6/2008 | Kogan et al. | |
| 2008/0154886 A1* | 6/2008 | Podowski | G06F 17/30646 |
| 2008/0184101 A1* | 7/2008 | Joshi | G06F 40/169 |
| | | | 715/230 |
| 2008/0201632 A1 | 8/2008 | Hong et al. | |
| 2008/0263023 A1* | 10/2008 | Vailaya | G06F 17/30675 |
| 2008/0270396 A1 | 10/2008 | Herscovici et al. | |
| 2008/0288859 A1* | 11/2008 | Yuan | G06F 17/2785 |
| | | | 715/234 |
| 2009/0157572 A1* | 6/2009 | Chidlovskii | G06N 20/00 |
| | | | 706/12 |
| 2009/0204465 A1 | 8/2009 | Pradhan | |
| 2009/0222490 A1 | 9/2009 | Kemp et al. | |
| 2011/0029521 A1 | 2/2011 | Thayne et al. | |
| 2011/0082848 A1* | 4/2011 | Goldentouch | G06F 16/9577 |
| | | | 707/706 |
| 2011/0131211 A1* | 6/2011 | Harrington | G06F 16/3323 |
| | | | 707/741 |
| 2011/0295844 A1 | 12/2011 | Sun et al. | |
| 2012/0143862 A1 | 6/2012 | Jones | |
| 2012/0254161 A1* | 10/2012 | Zhang | G06F 17/30675 |
| | | | 707/723 |
| 2012/0323625 A1 | 12/2012 | Lee | |
| 2013/0080428 A1 | 3/2013 | Wang et al. | |
| 2013/0124515 A1* | 5/2013 | Ghimire | G06F 17/212 |
| | | | 707/728 |
| 2013/0124546 A1 | 5/2013 | Wormley et al. | |
| 2013/0185252 A1 | 7/2013 | Palmucci | |
| 2013/0254126 A1* | 9/2013 | Koenig | G06F 40/169 |
| | | | 705/311 |
| 2014/0019562 A1 | 1/2014 | Le chevalier et al. | |
| 2014/0101527 A1* | 4/2014 | Suciu | G06F 17/218 |
| | | | 715/230 |
| 2014/0229475 A1* | 8/2014 | Walsh | G06F 16/35 |
| | | | 707/728 |
| 2014/0250377 A1 | 9/2014 | Bisca et al. | |
| 2014/0279893 A1 | 9/2014 | Branton | |
| 2014/0372417 A1 | 12/2014 | Olson | |
| 2015/0039560 A1 | 2/2015 | Barker et al. | |
| 2015/0169755 A1* | 6/2015 | Cierniak | G06F 17/211 |
| | | | 707/706 |
| 2015/0269153 A1 | 9/2015 | Fink et al. | |
| 2015/0302063 A1 | 10/2015 | Nigam et al. | |
| 2015/0339282 A1* | 11/2015 | Goyal | G06F 17/241 |
| | | | 715/229 |
| 2016/0034567 A1* | 2/2016 | Miller | G06F 16/3331 |
| | | | 707/728 |
| 2016/0070741 A1 | 3/2016 | Lin et al. | |
| 2016/0132613 A1 | 5/2016 | Obbard et al. | |
| 2016/0232567 A1 | 8/2016 | Vaynblat et al. | |
| 2016/0246886 A1 | 8/2016 | Chakraborty et al. | |
| 2016/0372079 A1* | 12/2016 | Ku | G09G 5/02 |
| 2017/0011073 A1 | 1/2017 | Deshpande et al. | |
| 2017/0075862 A1* | 3/2017 | Kumar | G06F 17/211 |
| 2017/0220546 A1* | 8/2017 | Codrington | G06F 3/0484 |
| 2017/0251072 A1* | 8/2017 | Rinehart | H04L 67/2804 |
| 2017/0351954 A1 | 12/2017 | Kosarek et al. | |
| 2018/0025303 A1* | 1/2018 | Janz | G06F 19/00 |
| | | | 705/2 |
| 2018/0165554 A1* | 6/2018 | Zhang | G06N 3/04 |
| 2020/0334298 A1 | 10/2020 | Mullins et al. | |

OTHER PUBLICATIONS

Xu, et al., "GooRaph: Document Visualization of Search Results," Retrieved on: Dec. 24, 2014, Available at: http://www.leeds.ac.uk/evie/workpackages/wp5/EDV_09_WP5_PR01_v2.1_DocVizOfSearchResults.pdf.

"Final Office Action Issued in U.S. Appl. No. 15/398,555", dated Apr. 10, 2019, 26 Pages.

"Non Final Office Action Issued in U.S. Appl. No. 15/399,405", dated Feb. 13, 2019, 15 Pages.

Elsas, et al., "Leveraging Temporal Dynamics of Document Content in Relevance Ranking", In Proceedings of the third ACM international conference on Web search and data mining, Feb. 4, 2010, 10 Pages.

"Non Final Office Action Issued in U.S. Appl. No. 15/398,555", dated Oct. 2, 2018, 32 Pages.

"Invitation to Pay Additional Fee Issued in PCT Application No. PCT/US17/064388", dated Feb. 19, 2018, 5 Pages.

"Final Office Action Issued in U.S. Appl. No. 15/399,405", dated Jun. 6, 2019, 13 Pages.

"Non Final Office Action Issued in U.S. Appl. No. 15/398,555", dated Sep. 17, 2019, 21 Pages.

"Non Final Office Action Issued in U.S. Appl. No. 15/399,405", dated Oct. 22, 2019, 16 Pages.

"Final Office Action Issued in U.S. Appl. No. 15/398,555", dated Feb. 3, 2020, 20 Pages.

* cited by examiner

DOCUMENT SEARCHING VISUALIZED WITHIN A DOCUMENT

BACKGROUND

Search engines allow a user to search for the documents in a corpus of documents that are relevant to their needs for or interests in particular kinds of information. In order to perform a search, a user submits to a search engine a query, such as a query made up of one or more words. In response to the query, the search engine identifies documents that appear to be relevant to the query, and returns a list of links to these documents called a query result. The user can follow the links in the query result to display or otherwise interact with the documents identified in the query result.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for annotating a visual representation of a document is described. The facility presents on a display device visual representations of two or more portions of a document. The facility further present on the display, in connection with each of one or more of the presented document portion visual representations, an annotation conveying a result of aggregating information describing two or more search transactions in whose results the represented document portion is included.

DETAILED DESCRIPTION

Figure 1:
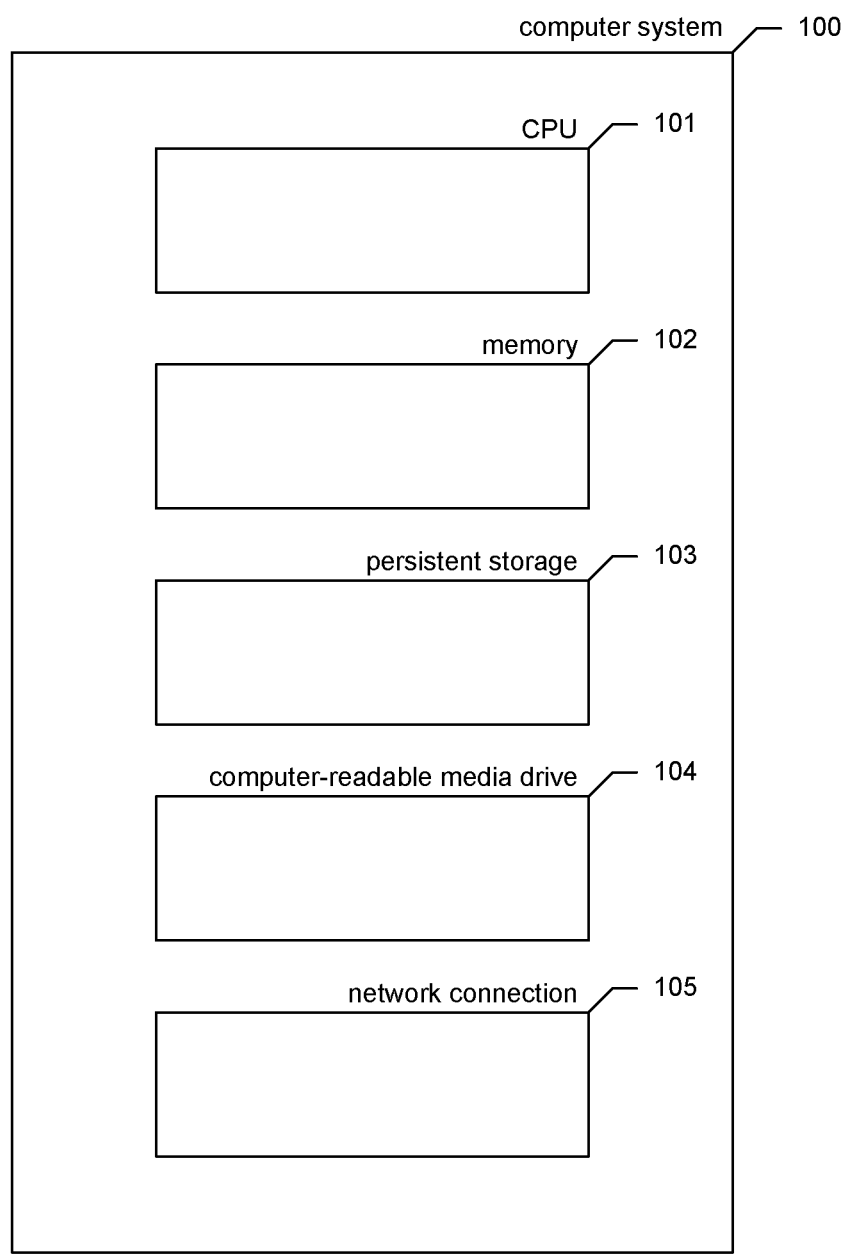
FIG. 1 is a block diagram showing some of the components typically incorporated in at least some of the computer systems and other devices on which the facility operates.

The inventors have recognized that information about document searching constitutes valuable feedback on documents and the ways in which they are useful. In particular, they have determined that it would be useful to document authors and others to be able to display, in connection with a particular document, information about search queries that have been or would be matched by different portions of the document, such as sections, pages, paragraphs, sentences, document storage units, etc.

Accordingly, the inventors have conceived and reduced to practice a software and/or hardware facility for visualizing, within a document, the results of document searching conducted within a corpus containing the document ("the facility"). In some embodiments, for each portion of a document, the facility (1) performs one or more aggregations across the document search transactions whose queries match the portion, then (2) displays a visual representation of the portion that reflects the result of this aggregation. For example, in some embodiments, the facility (1) counts the number of document search transactions whose queries match each paragraph of a document, then (2) displays a visual representation of the document in which, in the margin beside each paragraph, a colored rectangle indicates via its color the total number of document search transactions whose queries match it, relative to the other paragraphs.

In various embodiments, the facility operates with respect to document portions of a variety of kinds, including such nonexclusive examples as sections, pages, columns, paragraphs, lines, sentences, nodes of a graph making up a document, outline elements, spreadsheet cells, spreadsheet tabs, graphs, etc. These can occur in documents of a wide variety of types, including textual word processing documents; spreadsheets; slideshow documents; outline documents; lay, technical or architectural drawings documents; artistic documents; timeline documents; database records; webpage documents; emails and other types of messaging documents; etc.

In some embodiments, the facility performs various kinds of aggregations on information in the document search transactions for each document portion, using aggregations such as count, minimum, maximum, mean, median, etc. In some embodiments, the facility filters the matching document search transactions before aggregating them, such as by filtering them to include only transactions performed by users in a particular group, defined in various ways; transactions performed from a particular geographic location or region; transactions performed during a particular time period of any scale; transactions whose query results list the document portion in the 5, 20, or 100 most-relevant documents or document portions; transactions from whose query results the searching user accessed or otherwise interacted with the document or document portion; etc. In some embodiments, the facility similarly groups search transactions for aggregation on one or more factors, such as any of those identified above.

In some embodiments, the facility includes among the aggregated search transactions search transactions that, though they did not actually match portions of the document, would have matched under different conditions, such as current or future conditions that are different from the conditions under which the search transaction was performed. For example, documents that were not created at the time the search transaction occurred, documents that the searching user had inadequate permissions to access by searching, documents that had not yet been translated to the language in which the search transaction's query was expressed, etc. In some embodiments, the facility supports using similar functionality to determine how popular a particular document or document portion would be if made available to a population of searching users.

In various embodiments, the facility uses a variety of kinds of visual attributes to reflect the result of the aggregation; these can include various aspects of colors, including hue, saturation level, and/or brightness; patterns; shape sizes; shape types; shape border thicknesses, etc. In some embodiments, the facility also or instead annotates the document with text describing aggregation results, including copies of some or all of the matching queries; a numerical count of the number of matching queries; a textual indication of where in the search result the query most frequently occurred; the name of a user or group of users whose queries most frequently matched; the time period during which queries most frequently matched; etc.

In various embodiments, the facility visually augments the document representation with a variety of charts and graphs, such as a chart or graph displayed beside each document portion, a chart or graph that the facility displays for a document portion if the user hovers over or touches a document portion or a different kind of search information annotation applied to it, etc. In various embodiments, such charts and graphs are of a variety of types, including graphs and charts that show trends in aggregated transactions over time; charts and graphs that show aggregated transactions per user or per user group, such as the top searching users or user groups; maps that show the geographic location or region of the searching users behind the transactions, etc. In some embodiments, the facility uses an alternate display scheme in which, rather including document searching information in the context of a representation of the document, the facility displays a chart or graph in which portions of the document identified; for example, in some embodiments, the facility does so by displaying a stack chart in which each stack identifies a different portion of the document to which it corresponds, and whose height indicates the aggregation result for that document portion.

In some embodiments, the facility provides a mechanism to navigate directly to other documents and document portions that appear frequently and/or near the top in the same query results as a particular portion of the present document.

By performing in some or all of the ways described above, the facility provides a wealth of information on the significance and usefulness of documents and their individual portions.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
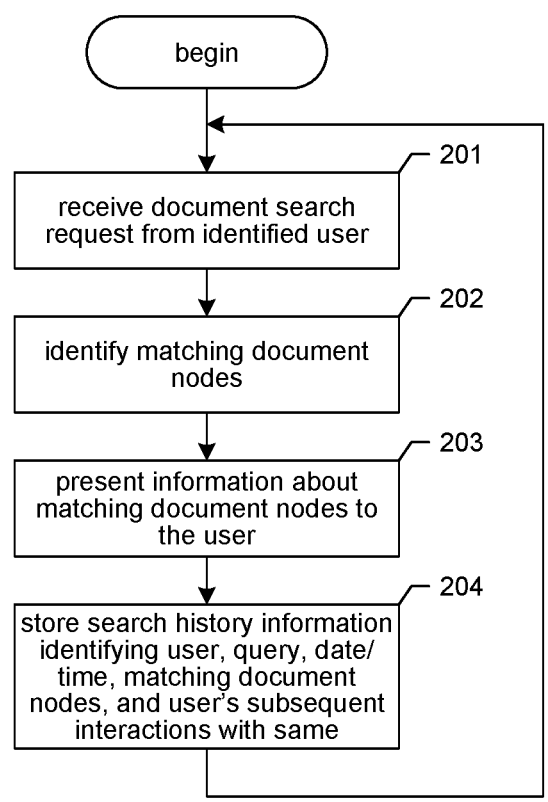
FIG. 2 is a flow diagram showing a process performed by the facility in some embodiments to compile search history information.

FIG. 2 is a flow diagram showing a process performed by the facility in some embodiments to compile search history information. In act 201, the facility receives a document search request from an identified user for a particular corpus of documents, sometimes called a "search domain," such as all of the documents stored in a company's document management system, all of the documents in a set of standards promulgated by a technical standards-setting organization, all of the documents accessible via the world wide web, etc. The document search request specifies a query, such as a query made up of one or more words. In act 202, the facility performs searching to identify document nodes or document portions of other types that match the query specified by the document search request received in act 201. In act 203, the facility presents to the requesting user a query result containing information about the matching document nodes identified in act 202. In act 204, the facility stores search history information that, in some embodiments, includes such information as user identity, search query, date/time, matching document nodes identified in act 202, and any interactions subsequently performed by the user with respect to the document nodes identified in the query result, such as viewing them, editing them, commenting on them, incorporating them in other documents, etc. After act 204, the facility continues in act 201 to receive the next document search request.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
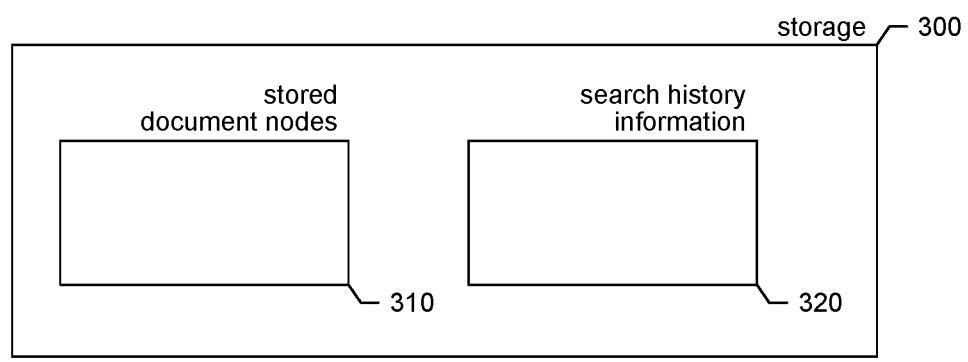
FIG. 3 is a data diagram showing data stored and/or access by the facility in some embodiments.

FIG. 3 is a data diagram showing data stored and/or access by the facility in some embodiments. One or more storage devices 300 contain the contents of document portions, such as the contents of document nodes. Storage devices further contain search history information, such as the search history information stored in act 204 shown in FIG. 2.

Figure 4:
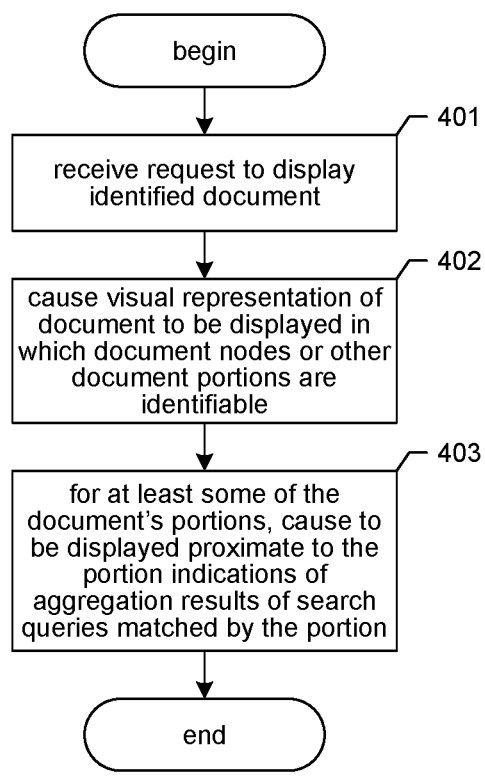
FIG. 4 is a flow diagram showing a process performed by the facility in some embodiments to display a visual representation of a document that reflects the result of aggregating across document search transactions whose queries match portions of the doc

FIG. 4 is a flow diagram showing a process performed by the facility in some embodiments to display a visual representation of a document that reflects the result of aggregating across document search transactions whose queries match portions of the document. In act 401, the facility receives a request to display a document identified by the request. In act 402, the facility causes a visual representation of the document to be displayed in which document nodes or other document portions can be visually discerned. In act 403, for at least some of the document's portions, the facility causes to be displayed proximate to the portion an indication of the result of aggregating issued search queries that match the portion. In some embodiments, the facility performs this aggregation itself, while in others, the facility retrieves or receives aggregation results generated externally to the facility. As noted above, in some embodiments, the search transactions matching each node are filtered in various ways before aggregation occurs. Examples showing the facility's performance of act 402 and 403 are shown in FIGS. 5-8 and discussed below. After act 403, this process concludes.

Figure 5:
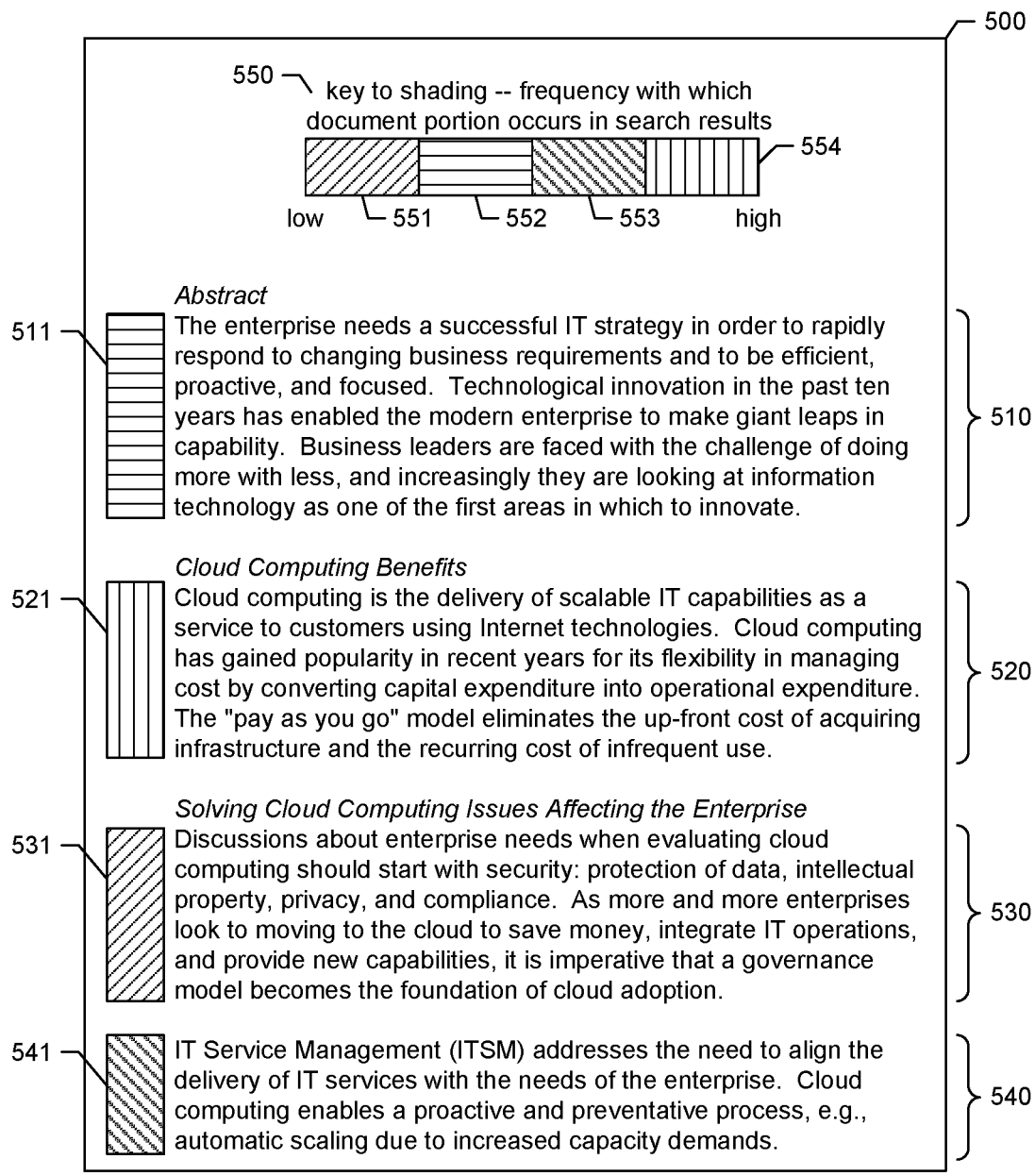
FIGS. 5-8 are display diagrams each showing an example of the facility augmenting a visual representation of a document with information aggregated from search transactions matching portions of the document.

FIGS. 5-8 are display diagrams each showing an example of the facility augmenting a visual representation of a document with information aggregated from search transactions matching portions of the document. FIG. 5 shows a first augmented visual representation of a sample document. This document representation 500 includes at least the paragraphs 510, 520, 530, and 540. Here, the facility treats each of these four paragraphs as document portions for which visual indications of aggregated searching information are individually displayed. In various embodiments, each of these paragraphs corresponds to a different, e.g., document node, document section, outline element, etc. It can be seen that, to the left of paragraph 530, the facility has caused to be displayed a visual indication 531 of aggregated searching information that is filled with pattern 551. By reference to pattern key 550, it can be seen that this visual indication 531 indicates that paragraph 530 occurs in search results at a relatively low frequency. Similarly, indication 511 indicates that paragraph 510 occurs at a higher intermediate frequency; indication 541 indicates that paragraph 540 occurs at a still higher intermediate frequency; and indication 521 indicates that paragraph 520 occurs at a high frequency. As noted above, in various embodiments, the facility uses a variety of other visual attributes to convey similar information-such as hue, saturation, brightness, etc. — with or without an explicit key. As also noted above, in some embodiments, the user can interact with this display, such as by touching or hovering over a document portion or associated indication to display a variety of kinds of additional search information for the portion.

Figure 6:
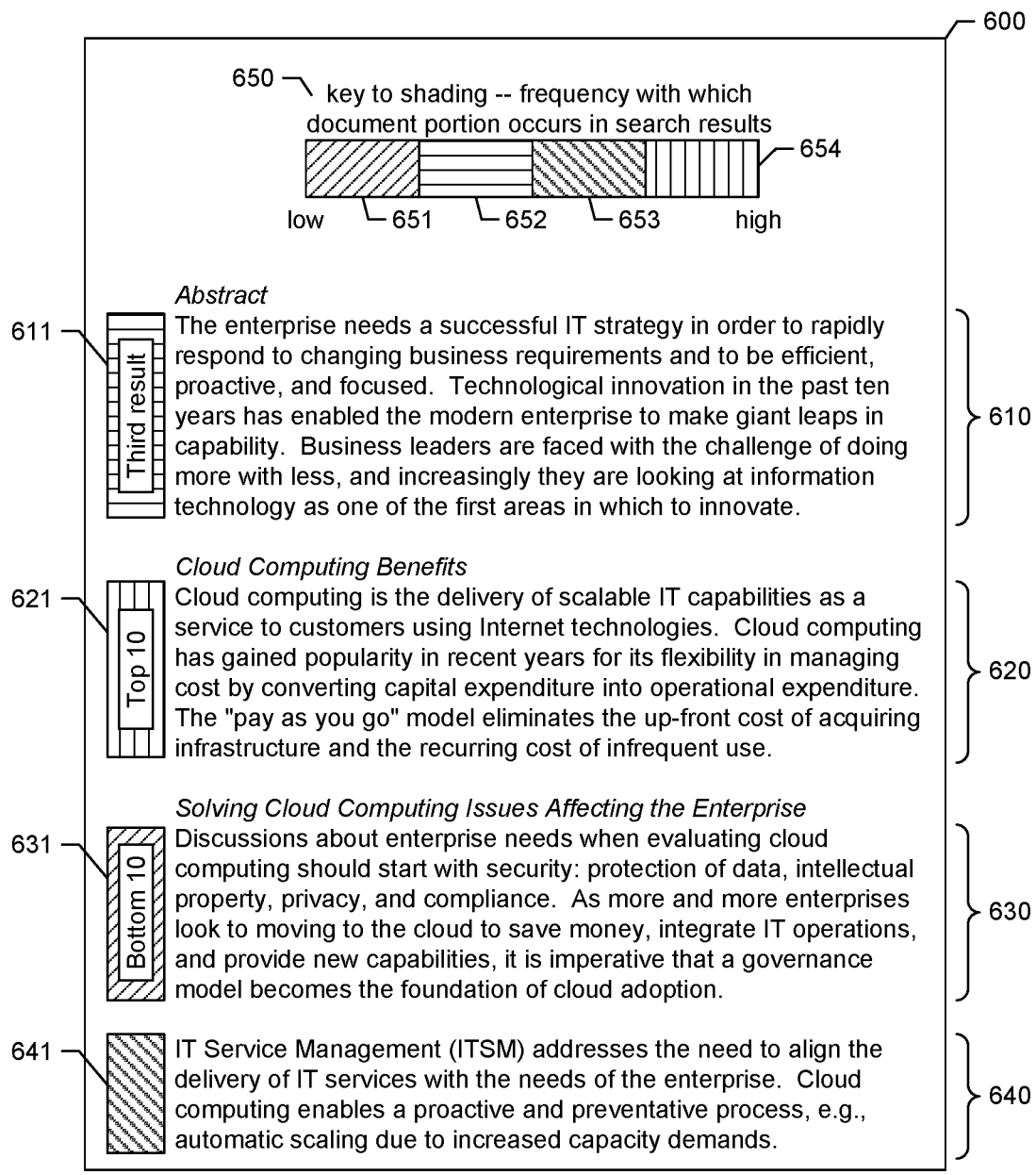

FIG. 6 shows a second augmented visual representation of the sample document. In display 600, the facility displays textual indications of search information, here the document portion's highest position in a search result. For example, indication 611 shows that, among the search results in which paragraph 610 was present, its highest position was number 3; indication 621 shows that, among the larger set of search results in which paragraph 620 was present, its highest position was among the top 10 results; and indication 631 shows that, among the search results in which paragraph 630 was present, its highest position was among the bottom 10 results.

Figure 7:
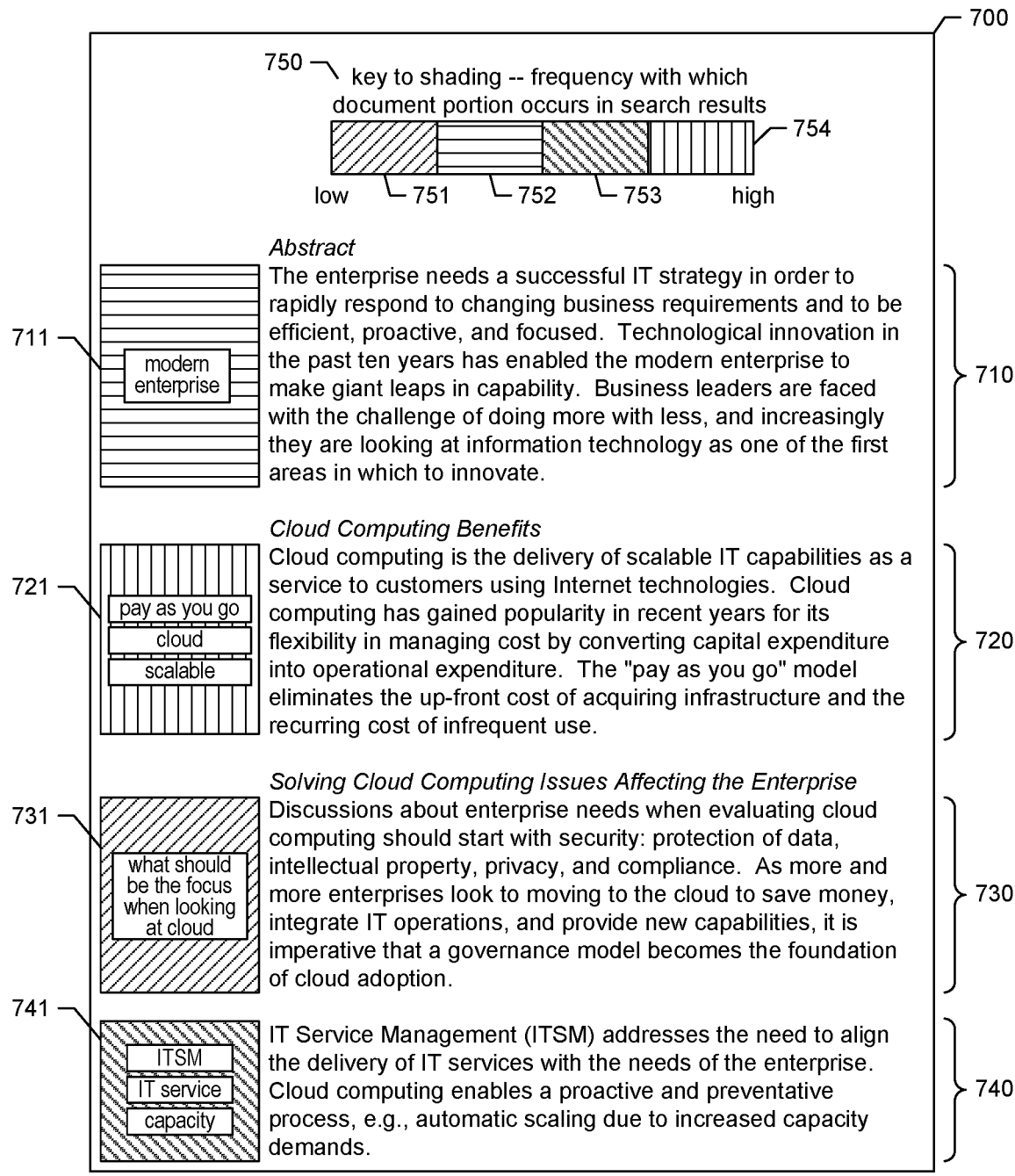

FIG. 7 shows a third augmented visual representation of the sample document. In display 700, the facility displays textual indications of search information, here one or more queries that were matched by each document portion. For example, indication 711 indicates that paragraph 710 matches a query containing the words "modern" and "enterprise"; indication 721 indicates that paragraph 720 matches a first query containing the words "pay", "as", "you", and "go", matches a second query containing the word "cloud", and matches a third query containing the word "scalable"; etc.

Figure 8:
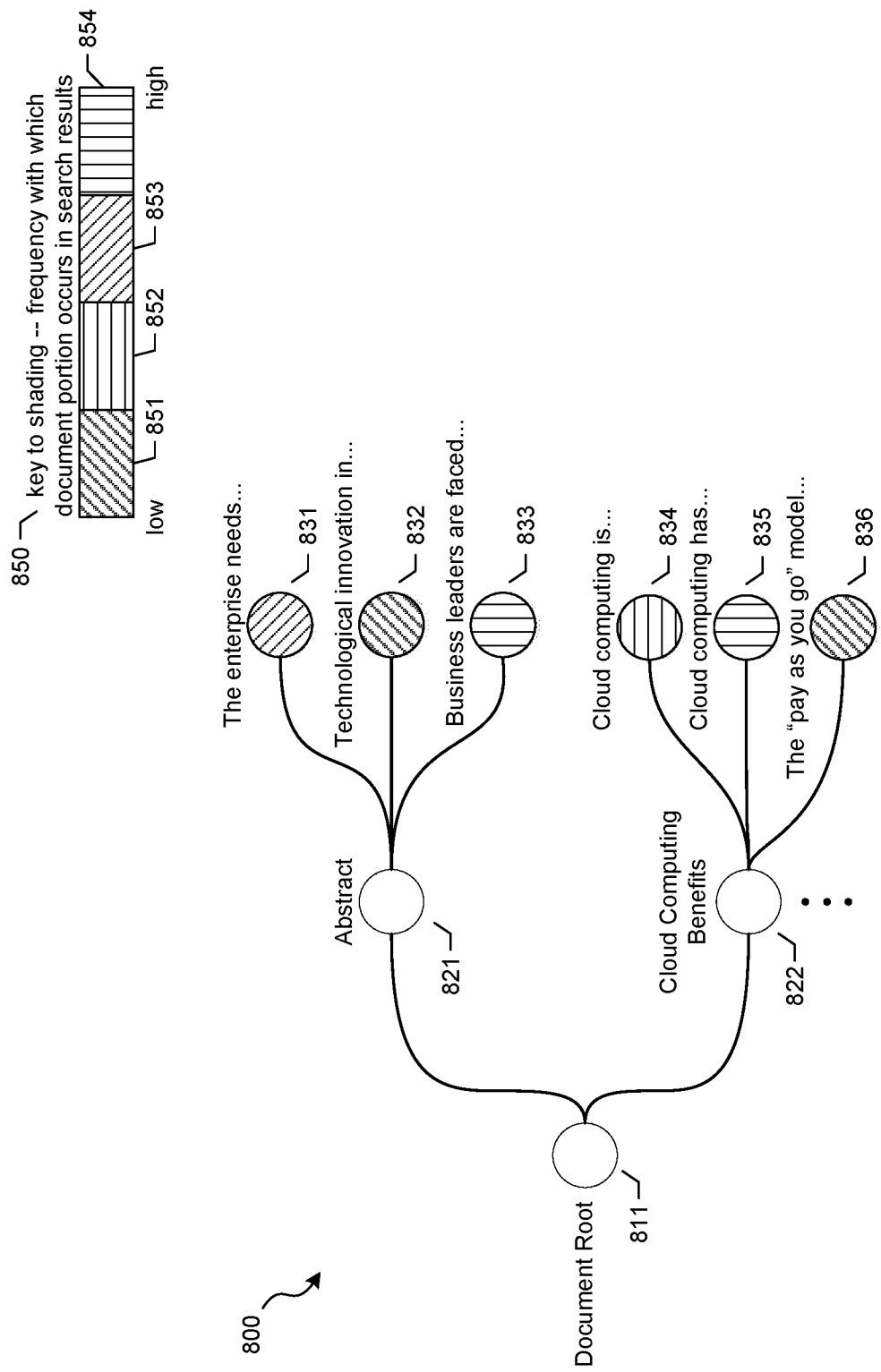

FIG. 8 shows a fourth augmented visual representation of the sample document. In this display, the document representation is a graph 800 of document nodes. In particular, the document representation shows that the document root node 811 representing the entire document is connected by "contains" edges to document content nodes 821 and 822. Document content note 821 represents an "Abstract" section of the document, and is connected by "contains" edges to document content nodes 831-833. Each of document content nodes 831-833 represents a different sentence in the "Abstract" section of the document represented by content node 821. It can be seen that the facility has filled each of content nodes 831-836 with a pattern indicating the frequency with which the node occurred in a search result. In some embodiments (not shown), search transactions that match a particular content node are also or instead attributed to one or more notes of the document graph that have containing relationship with the node most directly representing the matching content.

In some embodiments (not shown), the search history information 320 shown in FIG. 3 is stored in a document graph like the one depicted by the document representation shown in FIG. 8. For example, in a first approach used by the facility in some embodiments, content nodes such as content node 831-836 each directly contain either aggregation results for the node, or some or all of the information in individual transactions matching the node. In a second approach used by the facility in some embodiments, for each of content nodes 831-836, the content node is connected by a "query" edge to a single query node, which directly contains either aggregation results for the connected content node, or some or all of the information in individual transactions matching the connected content node. In a third approach used by the facility in some embodiments, for each of content nodes 831-836, the content node is connected by "query" edges to one or more query nodes each representing a single search transaction matching the connected content node; each of these query nodes contains information about the search transaction it represents. In some embodiments, in the third approach, each query node is connected by an "issued" edge to a user node representing the user who issued the request for the search transaction. These user notes containing information about the user including, in some embodiments, a user identifier that can be used to retrieve information such as the user's name and title, the identities of groups the user is in, other activities performed by the user, etc. in embodiments such as those described above, the facility accesses search information in the document graph in order to display indications reflecting aggregated search information for the document's portions.

In some embodiments, the facility provides a computer-readable medium having contents configured to cause a computing system to: for a document comprised of document portions: generate a visual representation of at least part of the document containing visual representations of two or more document portions; for each of at least one of the document portions whose visual representations are contained by the document's visual representation: perform an aggregation operation on information describing two or more search transactions in whose results the document portion is included to obtain an aggregation result; annotate the document portion's visual representation in the document's visual representation in accordance with the obtained aggregation result; and cause the annotated visual representation of the document to be displayed.

In some embodiments, the facility provides a processor-based device, comprising: a display; a processor; and a memory having contents that cause the processor to: present on the display visual representations of two or more portions of a document; and present on the display, in connection with each of one or more of the presented document portion visual representations, an annotation conveying a result of aggregating information describing two or more search transactions in whose results the represented document portion is included.

In some embodiments, the facility provides a computer-readable medium storing data representing a document, comprising: a document root node for the document; contains edges each connecting a document content node to the document root node to indicate that content of the document content node is contained by the document root node; the connected document content nodes; and associated with each of a selected plurality of connected document content nodes, information regarding earlier-issued search queries that match content of the document content node.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A persistent storage device having contents that, when executed by a processor, cause the processor to:
for a document comprised of document portions:
generate a visual representation of at least part of the document containing visual representations of two or more document portions;
for each of at least one of the document portions whose visual representations are contained by the document's visual representation:
perform an aggregation operation on information describing two or more previous search transactions in whose results the document portion is included to obtain an aggregation result;
annotate the document portion's visual representation in the document's visual representation in accordance with the obtained aggregation result; and
display the annotated visual representation of the document to be displayed, the annotated visual representation including an indication adjacent to text of the document portion,
wherein, for each of the two or more document portions whose visual representations are contained by the document's visual representation, the aggregated search transactions include performed search transactions in whose results the document portion was actually included;
wherein the indication includes at least one of a color or a pattern; and
wherein the indication relates to a relevance of the document portion on a scale; and
wherein, for a selected one of the document portions whose visual representations are contained by the document's visual representation:
the information describing the two or more previous search transactions in whose results the document portion is included identifies for each search transaction a query that was the basis for the search transaction, and
the annotation includes the content of the query of at least one of the search transactions in whose results the document portion is included, where the query was the basis for the search transaction.

2. The persistent storage device of claim 1 wherein, for a selected one of the document portions whose visual representations are contained by the document's visual representation:
the information describing the two or more previous search transactions in whose results the document portion is included identifies for each such search transaction a user who issued a search request upon which the search transaction is based; and
the aggregation operation is performed with respect to the user identified for each search transaction.

3. The persistent storage device of claim 1 wherein the document is organized as a graph of nodes connected by edges,
and wherein the visual representation of at least part of the document contains visual representations of document portions each corresponding to one of the nodes,
and wherein annotating each document portion's visual representation comprises applying a visual quality to the document portion's visual representation in accordance with the aggregation result obtained for the document portion.

4. The persistent storage device of claim 3 wherein, in the visual representation of the document, the edges between the nodes of the graph are explicitly visually represented.

5. The persistent storage device of claim 1 wherein the visual representation of the document contains some or all of the literal contents of at least some of the document portions.

6. The persistent storage device of claim 1 wherein the document is subject to an outline organization made up of outline elements,
and wherein each of the document portion visual representations contains one of the outline elements of the outline organization of the document.

7. The persistent storage device of claim 1 wherein the annotations of the document portions' visual representations are selected from among two or more colors.

8. The persistent storage device of claim 1 wherein the performed aggregation operation counts the search transactions in whose results each document portion is included.

9. The persistent storage device of claim 1 wherein, for each of at least one of the document portions whose visual representations are contained by the document's visual representation, the aggregated search transactions additionally include performed search transactions in whose results the document portion was not actually included, but in whose results the document portion would have been included had the document portion been available to the search transaction.

10. A processor-based device, comprising:
a display;
a processor; and
a persistent storage device having contents that cause the processor to:
present on the display visual representations of two or more portions of a document; and
present on the display, in connection with each of one or more of the presented document portion visual representations, an annotation conveying a result of aggregating information describing two or more previous search transactions in whose results the represented document portion is included,
wherein the annotation includes an indication adjacent to text of the document portion;
wherein, for each of the two or more portions of the document, the result of aggregating information describing two or more previous search transactions include performed search transactions in whose results the document portion was actually included;
wherein the indication includes at least one of a color or a pattern; and
wherein the indication relates to a relevance of the document portion, the relevance being on a scale; and
wherein, for a selected one of the document portions whose visual representations are contained by the document's visual representation:
the annotation includes the content of a query of at least one of the search transactions in whose results the document portion is included, where the query was the basis for the search transaction,
wherein the annotations of the document portions' visual representations are selected from among two or more colors.

11. The processor-based device of claim 10 wherein, for each of the annotated document portion visual representations the annotation conveys the result of counting the search transactions in whose results the document portion represented by the document portion visual representation is included.

\* \* \* \* \*